(12) United States Patent
Camasmie

(10) Patent No.: US 7,862,064 B2
(45) Date of Patent: Jan. 4, 2011

(54) BOOM FOR RECUMBENT BICYCLE

(75) Inventor: Paulo Camasmie, Windermere, FL (US)

(73) Assignee: Big Cat Human Powered Vehicles, LLC, Winter Garden, FL (US)

( * ) Notice: Subject to any disclaimer, the term of this patent is extended or adjusted under 35 U.S.C. 154(b) by 283 days.

(21) Appl. No.: 12/053,938

(22) Filed: Mar. 24, 2008

(65) Prior Publication Data

US 2009/0236821 A1   Sep. 24, 2009

(51) Int. Cl.
*B62K 3/10*   (2006.01)

(52) U.S. Cl. ............... 280/288.1; 280/281.1; 280/287; 280/278

(58) Field of Classification Search ............ 280/288.1, 280/281.1, 287, 278
See application file for complete search history.

(56) References Cited

U.S. PATENT DOCUMENTS

| D290,451 S | 6/1987 | Engum |
| D293,660 S | 1/1988 | Foehner |
| 5,544,906 A | 8/1996 | Clapper |
| D385,829 S | 11/1997 | Quick |
| D507,910 S | 8/2005 | Bock |
| 6,932,370 B2 | 8/2005 | Jones et al. |
| 7,228,173 B2 * | 6/2007 | Cazares ............... 607/14 |
| 7,232,141 B1 * | 6/2007 | Russell ............... 280/203 |
| 7,594,473 B2 * | 9/2009 | Kitchen et al. ........ 104/53 |

* cited by examiner

*Primary Examiner*—Lesley Morris
*Assistant Examiner*—Marlon A Arce
(74) *Attorney, Agent, or Firm*—GrayRobinson, P.A.

(57) ABSTRACT

A recumbent bicycle includes a boom that telescopes within one end of a center tube in the main frame of the bicycle, and a boom clamp that encircles the center tube of the main frame at a location overlying at least a portion of the boom. The boom clamp has a locator tab which extends into a notch formed in the center tube, and within a slot formed in the boom while the boom telescopes within the center tube. The location of the slot in the boom, and the location of the tab relative to the center tube, are chosen to ensure that throughout the telescoping movement of the boom it is retained in a desired orientation with respect to the main frame.

8 Claims, 3 Drawing Sheets

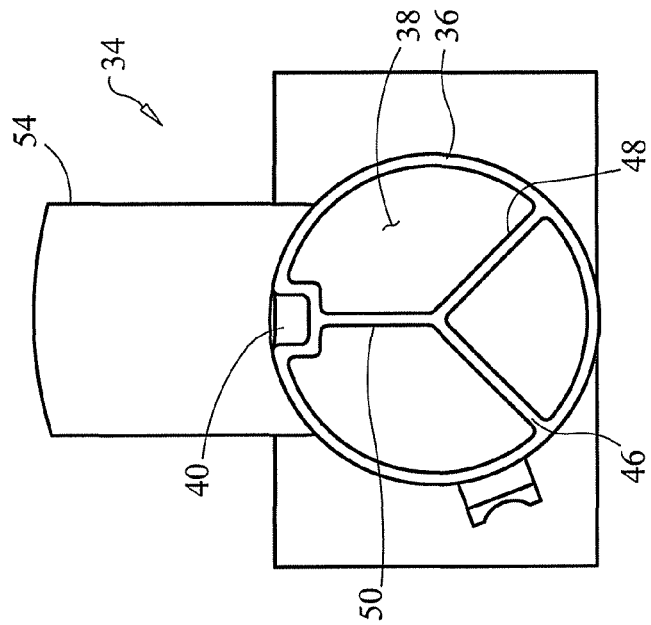
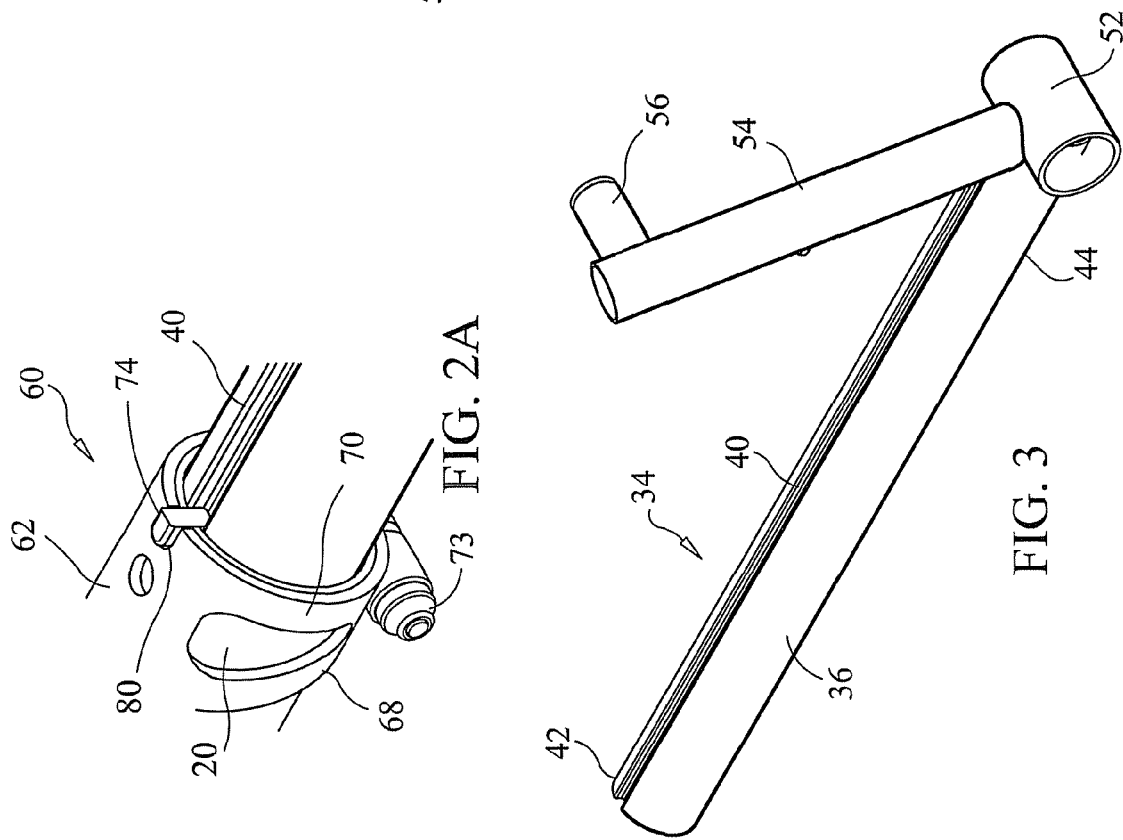

BOOM FOR RECUMBENT BICYCLE

FIELD OF THE INVENTION

This invention relates to recumbent bicycles, and, more particularly, to an improved boom having internal reinforcement and structure for aligning the pedals of the recumbent with the main frame.

BACKGROUND OF THE INVENTION

Recumbent bicycles generally comprise a main frame coupled to a front wheel and a rear wheel with a seating area that places the rider in a supine position. In most designs, the main frame includes a hollow center tube and a boom having a first end, and a second end coupled to the pedals of the recumbent. The first end of the boom telescopes within the center tube to adjust the position of the pedals relative to the seating area to accommodate riders of different height. The boom is held in place within the center tube by a boom clamp.

One problem with existing recumbent designs is that it is difficult to maintain proper alignment between the pedals and main frame when the boom telescopes in or out of the center tube to adjust the pedal position. The boom is free to rotate during such telescoping movement, often resulting in misalignment of the pedals relative to the seating area and remainder of the main frame.

SUMMARY OF THE INVENTION

The recumbent of this invention is provided with an improved boom and clamping arrangement that ensures precise alignment of the pedals relative to the main frame regardless of the position of the boom within the center tube of the main frame.

In the presently preferred embodiment, the boom of this invention is formed with an elongated slot extending from end-to-end. A number of reinforcing plates are located within the interior of the boom which extend from the wall of the boom into engagement with one another at its center, thus adding rigidity and strength to the boom. A boom clamp encircles the center tube of the main frame at a location overlying at least a portion of the boom that is inserted within the center tube. When tightened down, the boom clamp is effective to retain the boom in engagement with the center tube. The boom clamp has a locator tab which extends into a notch formed in the center tube of the main frame and into the slot in the boom. The locator tab remains within such slot as the boom telescopes within the center tube. The positioning of the notch in the main frame, the slot in the boom, and the orientation of the locator tab on the boom clamp, are chosen to ensure that throughout the telescoping movement of the boom within the center tube the pedals remain properly aligned with respect to the main frame.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 2A is an enlarged view of the encircled portion of FIG. 2 showing the connection of the locator tab with both the slot in the boom and the notch in the center tube of the main frame;

FIG. 3 is a perspective view of the boom; and

FIG. 4 is an end view of the boom shown in FIG. 3.

DETAILED DESCRIPTION OF THE INVENTION

Figure 1:
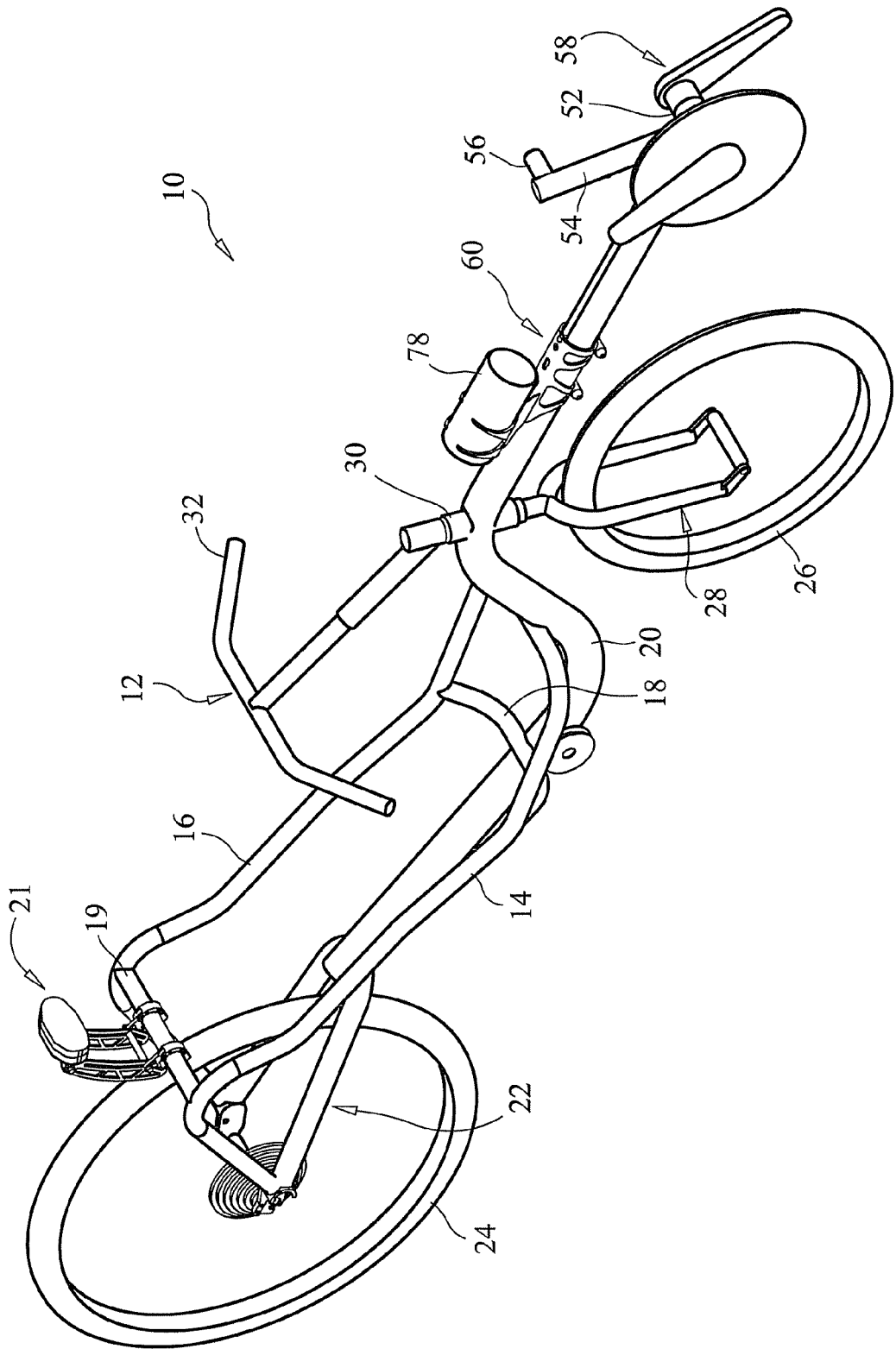
FIG. 1 is a perspective view of a recumbent bicycle having the improved boom and boom clamp of this invention.

Referring now to the Figs., a recumbent bicycle 10 according to this invention is illustrated. Except as discussed below, the details of the structure of the recumbent 10 form no part of this invention and are therefore described generally herein. The recumbent 10 generally includes a main frame 12 having a side tube 14 and a side tube 16 that are connected to one another by two cross tubes 18 and 19, and, are joined with a center tube 20. A seat (not shown) is located in the area between the side tubes 14, 16, and a head rest 21 is mounted to the cross tube 19. A rear fork 22 coupled to the center tube 20 mounts a rear wheel 24, and a front wheel 26 is coupled to the center tube 20 by a front fork 28 and stem 30. Handlebars 32 extend from the stem 30. For purposes of the present discussion, the terms "front," "rear," "top," "bottom," "upwardly," "downwardly" and the like refer to the orientation of the recumbent 10 as viewed in FIGS. 1 and 2.

Figure 2:
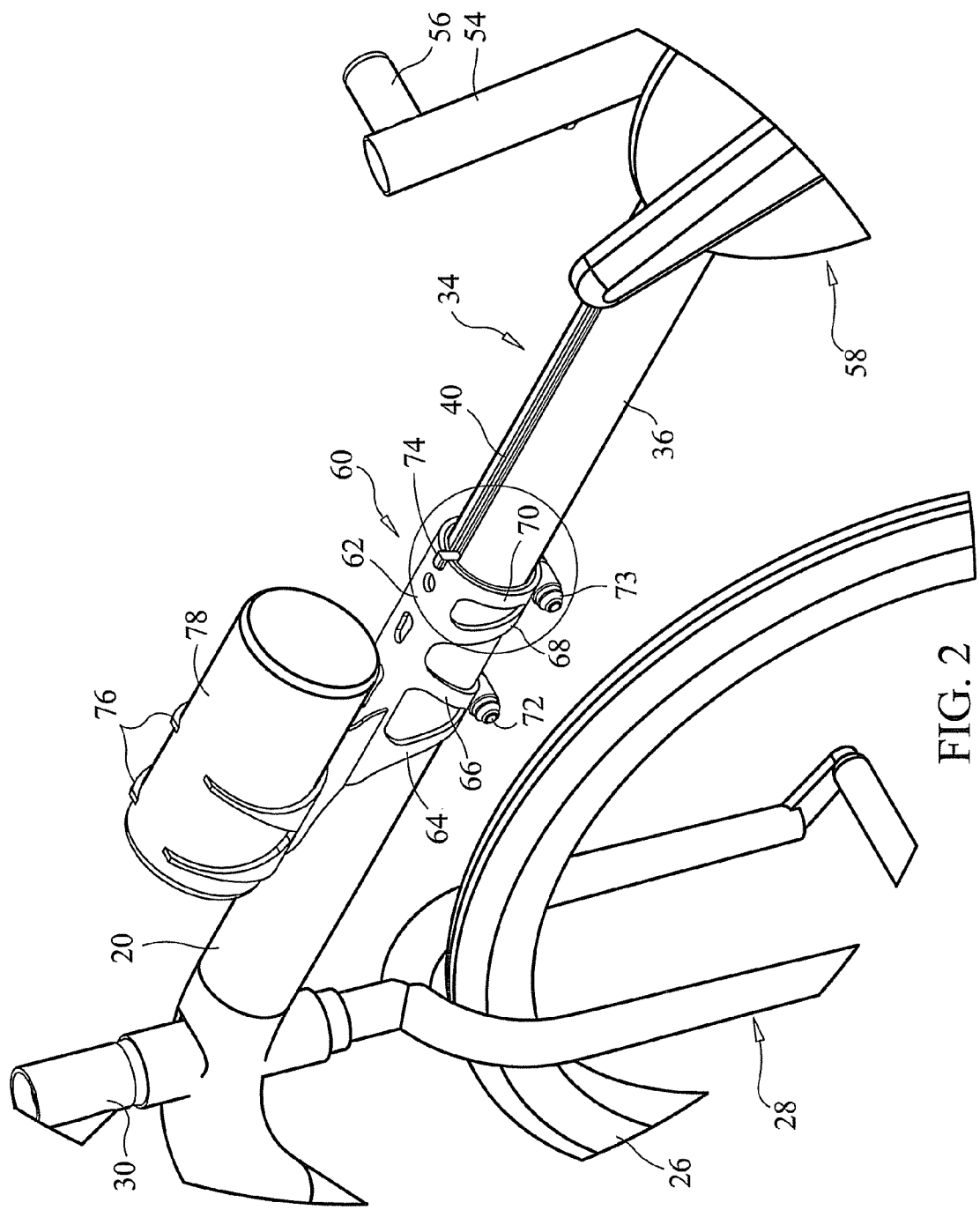
FIG. 2 is an enlarged view of a portion of FIG. 1 depicting the engagement of the slot in the boom and the locator tab of the boom clamp in greater detail.

As best seen in FIGS. 3 and 4, a boom 34 is provided that is extruded from a suitable light-weight metal such as aluminum forming a wall 36 defining a hollow interior 38. The wall 36 is recessed at the top, as viewed in FIGS. 3 and 4, forming an elongated slot 40 that extends from a first end 42 of the boom 34 to its second end 44. Three reinforcing plates 46, 48 and 50 are located within the interior 38 of the boom 34 to enhance its structural rigidity and integrity. One end of each plate 46, 48 and 50 extends inwardly from the wall 36 of boom 34, and the opposite ends thereof connect to one another at the center of the boom 34. The second end 44 of the boom 34 is coupled to a pedal mount 52 and to an upright tube 54 having a light mount 56 at its free end. As seen in FIGS. 1 and 2, the pedal mount 52 supports pedals 58.

With reference to FIGS. 1, 2 and 2A, a boom clamp 60 encircles the center tube 20 at the front of the main frame 12, e.g. where the front wheel 26 is located. A body portion 62 of the boom clamp 60 rests atop the center tube 20, and several fingers 64, 66, 68 and 70 extend from the body portion 62 around the bottom of the center tube 20. At least two of the fingers, e.g. 66 and 70 as shown in FIGS. 1 and 2, are spaced apart and clamps 72, 73, respectively, span the space between their free ends. The forward end of the boom clamp 60 mounts a downwardly extending locator tab 74 that projects beneath the body portion 62 thereof. A cage 76 is secured to the rearward end of the boom clamp 60, and it mounts a bottle 78.

The forward end of the center tube 20 is formed with a notch 80, and has a hollow interior with an inner diameter sized to receive the boom 34. The boom clamp 60 encircles the forward end of the center tube 20 in a position such that the tab 74 of the boom clamp 60 extends into the notch 80 of the center tube 20. The boom 34 telescopes in and out of the center tube 24 in order to adjust the position of the pedals 58 located at the front or second end 44 of the boom 34 with respect to the main frame 12 to accommodate riders of different height. When the boom 34 is inserted into the center tube 20, the tab 74 of the boom clamp 60 extends into the slot 40 of the boom 34. The tab 74 of the boom clamp 60 remains within the slot 40 regardless of how much or how little of the length of the boom 34 is telescoped into the center tube 20. The pedals 58 coupled to the boom 34 remain in the proper, centered position relative to the main frame 12, and, hence, the seating area of the recumbent 10, throughout such telescoping movement of the boom 34 due to the combination of the notch 80 in the center tube 20, the slot 40 in the boom 34 and the locator tab 74 in the boom clamp 60. The boom clamp 60 is oriented in the correct, aligned position on the center tube because the tab 74 registers within the notch 80 in the center tube. With the boom clamp 60 in the proper position, the boom 34 may be inserted into the center tube 20 and the only way it can do so without interference from the tab 74 is for the tab 74 to be received within the slot 40 in the boom 34. Consequently, the center tube 20, boom clamp 60 and boom 34 are all properly aligned with one another upon assembly. Unlike prior art designs, the boom 34 cannot rotate with respect to the center tube 20 when the boom 34 is telescoped in and out of the center tube 20, due to the engagement of the tab 74 with the slot 40, thus ensuring proper angular orientation of the pedals 58 relative to the main frame 12 regardless of the position of the boom 34. When the desired distance between the pedals 58 and seating area of the main frame 12 is obtained, the clamps 72 and 73 may be tightened down to urge the center tube 20 against the boom 34 and secure them together.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, while a two-wheel recumbent bicycle is shown in the Figs. and described herein, it should be understood that this invention applies equally to a 3-wheel recumbent bicycle having a boom and main frame connection as described herein.

Therefore, it is intended that the invention not be limited to the particular embodiment disclosed as the best mode contemplated for carrying out this invention, but that the invention will include all embodiments falling within the scope of the appended claims.

What is claimed is:

1. A recumbent bicycle, comprising:
   a main frame including a center tube having a wall defining a hollow interior, said wall being formed with a notch;
   a boom having a first end, a second end and a wall formed with an elongated slot extending in a direction between said first and second ends, said first end of said boom telescoping within said hollow interior of said center tube;
   a boom clamp mounted to said center tube, said boom clamp having a locator tab, said locator tab being inserted within said notch and into contact with said wall of said center tube, said locator tab being inserted within said slot and into contact with said wall of said boom, said locator tab preventing relative rotation between said center tube and said boom, said locator tab being moveable along said slot as said boom telescopes within said hollow interior of said center tube to maintain alignment of said boom with respect to said main frame, said boom clamp being effective to releasably connect said center tube and said boom.

2. The recumbent bicycle of claim 1 in which said boom includes a number of reinforcing plates located within said hollow interior, said reinforcing plates extending from said wall thereof and being joined to one another at the center of said hollow interior.

3. The recumbent bicycle of claim 1 further including pedals coupled to said second end of said boom, said slot in said boom being formed at a location such that upon engagement with said locator tab of said boom clamp said pedals are positioned in alignment with said main frame.

4. The recumbent bicycle of claim 3 in which said notch in said center tube of said main frame is positioned to orient said boom clamp in an aligned position relative to said main frame upon engagement of said locator tab of said boom clamp within said notch, said boom being oriented in an aligned position with respect to said main frame upon insertion into said center tube with said slot receiving said locator tab.

5. A recumbent bicycle, comprising:
   a main frame including a center tube having a wall defining a hollow interior, said wall being formed with a notch;
   a boom having a first end, a second end and an elongated slot extending in a direction between said first and second ends, said first end of said boom telescoping within said hollow interior of said center tube;
   pedals coupled to said second end of said boom;
   a boom clamp mounted to said center tube in a position encircling at least a portion of said boom so that upon tightening of said boom clamp said boom is releasably retained within said center tube, said boom clamp having a locator tab that is insertable within said notch in said center tube, said locator tab being movable within said slot of said boom as said boom telescopes within said center tube to adjust the position of said pedals for riders of different height, said slot being oriented along said boom and said locator tab being positioned relative to said center tube so that said pedals are aligned with said main frame regardless of the position of said boom within said center tube.

6. The recumbent bicycle of claim 5 in which said boom is formed with a wall defining a hollow interior, said wall being formed with a longitudinally extending recess that defines said elongated slot.

7. The recumbent bicycle of claim 6 in which said boom includes a number of reinforcing plates located within said hollow interior, said reinforcing plates extending from said wall thereof and being joined to one another at the center of said hollow interior.

8. The recumbent bicycle of claim 5 in which said notch in said center tube of said main frame is positioned to orient said boom clamp in an aligned position relative to said main frame upon engagement of said locator tab of said boom clamp within said notch, said boom being oriented in an aligned position with respect to said main frame upon insertion of said boom into said center tube with said slot receiving said locator tab.

\* \* \* \* \*